United States Patent
Maurer et al.

(10) Patent No.: US 7,061,668 B2
(45) Date of Patent: Jun. 13, 2006

(54) FAST OPTICAL AMPLIFIER CONTROL CIRCUIT

(75) Inventors: Erich K. Maurer, Vienna (AT); Kuno Zhuber-Okrog, Vienna (AT)

(73) Assignee: Siemens Communications Inc., Boca Raton, FL (US)

( * ) Notice: Subject to any disclaimer, the term of this patent is extended or adjusted under 35 U.S.C. 154(b) by 258 days.

(21) Appl. No.: 10/393,563

(22) Filed: Mar. 21, 2003

(65) Prior Publication Data

US 2004/0021932 A1    Feb. 5, 2004

Related U.S. Application Data

(60) Provisional application No. 60/366,413, filed on Mar. 21, 2002.

(51) Int. Cl.
*H04B 4/00* (2006.01)
(52) U.S. Cl. .............................. 359/341.41; 359/341.4
(58) Field of Classification Search ........... 359/341.41, 359/341.4
See application file for complete search history.

(56) References Cited

U.S. PATENT DOCUMENTS

| | | | |
|---|---|---|---|
| 5,446,812 A | 8/1995 | Hirst ........................... | 385/24 |
| 5,923,462 A * | 7/1999 | van der Plaats .......... | 359/341.3 |
| 6,366,395 B1 * | 4/2002 | Drake et al. ........... | 359/341.41 |
| 6,377,394 B1 * | 4/2002 | Drake et al. ........... | 359/341.41 |
| 6,452,722 B1 * | 9/2002 | Krummrich et al. ... | 359/341.41 |
| 6,522,460 B1 * | 2/2003 | Bonnedal et al. ...... | 359/341.42 |
| 6,631,027 B1 * | 10/2003 | Gerrish et al. ......... | 359/341.41 |
| 6,690,505 B1 * | 2/2004 | Ye ............................. | 359/337 |
| 2003/0030894 A1 * | 2/2003 | Stentz ................... | 359/341.41 |
| 2004/0240044 A1 * | 12/2004 | Park et al. ............. | 359/341.41 |

FOREIGN PATENT DOCUMENTS

| | | |
|---|---|---|
| DE | 2301945 C2 | 4/1982 |
| FR | 2 759 831 A1 | 8/1998 |
| WO | PCT/DE99/00963 | 3/1999 |

OTHER PUBLICATIONS

Patent Abstract of Japan, Publication No. 05063643, dated Mar. 12, 1993.

(Continued)

*Primary Examiner*—Deandra Hughes
*Assistant Examiner*—Eric Bolda

(57) ABSTRACT

A gain control circuit for an optical amplifier includes a feed-forward path which enables the pump power of an excitation laser to be controlled based on input power of the amplifier. The feed-forward path is complemented by a feed-back loop which includes: a subtractor that outputs an error signal based on a difference between scaled input power and output power of the optical amplifier; a regulator which generates a bias and correction signal that reduces the error signal to zero; and an adder which adds the bias and correction signal to the input power signal of the feed-forward path. The output of the adder forms a pump control signal which maintains a desired gain of the amplifier irrespective of fluctuations in input power and channel load changes, as well as other influences. Through the use of purely electronic control, the control circuit controls the gain of the amplifier with substantially less pump power than conventional circuits utilizing other known methods. Further, the feed-forward path eliminates gain sag which degrades the performance of many conventional amplifier circuits. Preferably, the control circuit is dynamically adapted to the non-linear dynamic behavior of the optical amplifier. This will advantageously result in a substantial improvement in speed of the amplifier control.

8 Claims, 11 Drawing Sheets

OTHER PUBLICATIONS

Patent Abstract of Japan, Publication No. 10190107, dated Jul. 21, 1998.

Patent Abstract of Japan, Publication No. 04293025, dated Oct. 16, 1992.

Article by A.K. Sristava et al. Entitled "Fast Gain Control in an Erbium-Doped Fiber Amplifier", Proceedings Optical Amplifiers and Their Application 1996, Monterrey, CA paper date PDP4 (1996) pp. PDP 4-2-5.

Article by M. Zirngibl entitled "Gain Control in Erbium-doped Fibre Amplifiers By An All-optical Feedback Loop", Electronics Letters, vol. 27, No. 7 (1991), pp. 560-1.

Article by J.F. Massicott et al. Entitled "1480nm Pumped Erbium Doped Fibre Amplifier With All Optical Automatic Gain Control", Electronics Letters vol. 30, No. 12 (1994) pp. 96-4.

Article by J. Chung and S.Y. Kim entitled "Dynamic Performance of the All-Optical Gain-Controlled EDFA Cascade in Multi-Wavelength Add/Drop Networks", 23$^{rd}$ European Conference on Optical Communications ECOC 97 IEE Conference Publication No. 448 (1997) pp. 139-142.

Article by J.L. Zyskind et al. Entitled "Fast Link Control Protection For Surviving Channels In Multiwavelength Optical Networks" 22$^{nd}$ European Conference on Optical Communications ECOC '96, Oslo, paper THC3.6 (1996) pp. 5.49-5.52.

Article by M. Karasek and F.W. Williams Entitled "Suppression of Dynamic Cross Saturation in Cascades of Overpumped Erbium-Doped Fibre Amplifiers" IEEE Photonics Technology Letters vol. 10, No. 7 (1998) pp. 1036-1038.

* cited by examiner

FAST OPTICAL AMPLIFIER CONTROL CIRCUIT

This application claims benefit to provisional application No. 60/366,413 filed Mar. 21, 2002.

BACKGROUND OF THE INVENTION

1. Field of the Invention

This invention generally relates to amplifying optical signals, and more particularly to a control circuit and method for regulating the gain of an optical amplifier.

2. Description of the Related Art

Rare-earth doped, optical-fiber amplifiers are used in a wide variety of communications applications to generate appropriate high-power optical signals. In the telecommunications industry, especially where multi-channel transmission systems are employed, erbium-doped fiber amplifiers (EDFAs) have proven useful because they operate at wavelengths that reduce fiber and component losses and minimize dispersion effects. EDFAs are also attractive from a telecommunications standpoint because they produce high gain with relatively little noise and demonstrate polarization independency.

The gain of an optical fiber amplifier depends on a variety of parameters including the rare-earth ion concentration, the length of the doped fiber, the radius of the fiber core, and the power of the pump laser. With respect to this last parameter, it has been shown that the simplest way to operate an amplifier is with a constant pump power. By using a constant power, the amplifier demonstrates exceptional stability characteristics because it operates in saturation (i.e., provides essentially constant power output) over a wide range of input power. Optical fiber amplifiers, however, are not without drawbacks.

The gain of the amplifier tends to vary inversely with fluctuations in input power. As a result, the mean state of inversion in the gain medium changes, which produces a different gain profile, i.e., gain tilt. Changes in channel power also adversely affect amplifier performance. Specifically, when channels are added to the system, the powers of the remaining channels drop, and when channels are switched off, the powers of the remaining channels increase. This is problematic since a channel power that changes too quickly will produce bit errors in the receiver of the channel, which degrades the performance and integrity of data transmitted in the system. In the extreme, the channel power may even fall outside the receiver dynamic range, whereupon long sequences of bit errors may be generated.

In order to overcome these drawbacks, various approaches have been developed for controlling the gain of an optical amplifier in order to produce a stable output power in each channel.

One approach involves operating the amplifier in the non-saturated or linear power regime. Under these circumstances, a higher pump power must be used in order to avoid depletion by the amplified signal. A significant amount of pump power in the gain medium is left unused, however, and the amplifying medium must therefore be made shorter, either physically or effectively through a reduction in active ion concentration. Alternatively, the pump power may be transported in a waveguide with a large cross-section. An explanation of this phenomenon is described in M. Karasek and F. W. Willems: *Suppression of Dynamic Cross Saturation in Cascades of Overpumped Erbium-Doped Fiber Amplifiers*, IEEE Photonics Technology Letters, Vol 10, No. 7, pp. 1036–1038, (1998).

This approach has proven to be undesirable because in order to be effective, the required pump power of a saturated amplifier is about three times greater than that required to operate the amplifier in its saturated mode. This high power requirement is unsuitable for most practical, usable systems, particularly in multi-channel telecommunications applications where more than one costly pump laser must be used to fulfill transmission requirements.

Another approach involves the transmission of an extra link control channel which adds power to the signal so that the total power remains constant. An explanation of this solution is described in Zyskind et al., *Fast Link Control Protection for Surviving Channels in Multiwavelength Optical Networks*, $22^{nd}$ European Conference on Optical Communications ECOC'96, Oslo, Paper ThC3.6, pp 5.49–552, (1996).

This approach is undesirable because it requires the use of a high-power laser to generate the link control channel signal. More specifically, in operation, the link control channel takes over the power of nearly all channels when a majority of the channels are switched off. The non-linear interaction of the payload channels with the strong link control channel produces ghost channel signals through four-wave mixing, which interfere with the payload channels. In this way the total number of transmitted channels is limited by four-wave mixing and, in some cases, by the available laser power of the link control channel laser. Further, the total power expended constantly must be high, often higher than the total power of all the maximum number of channels that are supported over this link. This power requirement is present irrespective of the number of channels in actual use. Finally, in order to implement this approach, a very fast control circuit must be used to control the speed of the link control channel. All of these drawbacks result in increased cost and power requirements for the optical system that employs the amplifier.

Another approach involves optical self-oscillation of the amplifier, which is commonly referred to as gain-clamped operation. For an explanation of this, see Chung et al., *Dynamic Performance of the All-Optical Gain-Controlled EDFA Cascade in Multi-Wavelength Add/Drop Networks*, $23^{rd}$ European Conference on Optical Communications ECOC 97, IEE Conference Publication No. 448, pp. 139–142, (1997).

This approach is undesirable because it requires the use of high pump power in order generate the self-oscillation. Other drawbacks include both an increase in the noise figure when the self-oscillation includes a backwards traveling wave and the need for extra optical components. Both of these increase the overall cost of the system. A further complicating drawback associated with this approach is the difficulty of choosing the desired gain since it is defined by the optical feedback.

All the above approaches are undesirable for at least the reason that they waste pump power. In the approach of the over-pumped amplifier, excessive pump power is coupled out of the transmission fiber. In the case of the link control channel, excessive pump power is used to amplify the link control signal. In the self-oscillating approach, pump power is used to build up and sustain self-oscillation.

Another common approach to the gain variations involves controlling amplifier gain through adjustments in laser pump power. FIG. 1 shows one such circuit used to implement this approach. This circuit includes an input power monitor 100 and an output power monitor 110 connected to respective ends of an optical amplifier 105. In operation, a difference circuit 115 outputs an error signal which is proportional to the input and output power of the amplifier. A regulator 120 then generates a pump control signal based on the error signal which regulates the gain of the amplifier. The regulator performs this function by amplifying the error signal as much as possible in a stable manner so that the output of the optical amplifier will be adjusted in a direction which minimizes the error signal. The amplifier may even be controlled to have infinite gain at zero frequency, which reduces the error signal to zero in steady state.

The approach taken in FIG. 1 has revealed drawbacks related to sag or bump in amplifier gain, as shown in FIG. 2. More specifically, in conventional circuits such as shown in FIG. 1, the speed of the optical amplifier limits the speed of the regulator. For stability, the regulator must be slower than the amplifier at all operating conditions, including at very low input powers where it is especially slow. The slow response time of this loop causes the gain of the amplifier to sag, at 28, especially after a sudden input power increase. Also, a bump in amplifier gain, at 29, is generated after a sudden input power drop occurs, as shown in FIG. 2. These sag and bump effects translate into compromised bit-error performance of the amplifier at the receiver.

In view of the foregoing considerations, it is apparent that there is a need for an improved control circuit and method for regulating the gain of an optical amplifier, and more specifically, for a control circuit that allows the amplifier to maintain a constant gain irrespective of fluctuations in input power while avoiding the drawbacks of the previous approaches discussed above.

SUMMARY OF THE INVENTION

In accordance with one embodiment of the present invention a control circuit and method is provided for an optical amplifier which causes the amplifier to exhibit constant gain irrespective of changes in input power caused by changing channel loads, fluctuations of input power, aging and temperatures sensitivities of the amplifier as well as other external influences.

According to another aspect of the present invention, a control circuit and method are provided that regulate the pump power of an optical amplifier with a speed sufficient to prevent sag in amplifier gain.

According to another aspect of the present invention, a control circuit and method is provided which regulates the gain of an optical amplifier using substantially less pump power than conventional control circuits.

According to another aspect of the present invention, a control circuit and method is provided which achieves all the foregoing objectives while allowing the amplifier to maintain low-noise, efficient channel power distribution, a smooth frequency response, and without the addition of expensive optical components.

The foregoing is achieved by providing a gain control circuit for an optical amplifier, comprising preferably a feed-forward path which enables the pump power of one or more excitation lasers to be controlled based on the input power of the amplifier, and a regulator control circuit which is responsive to a difference signal representing the gain error based on both the input power and output power, where the given control circuit adjusts its behavior as function of the input power level of the optical amplifier. The regulator control circuit includes an input power monitor unit, a subtractor which outputs an error signal based on a difference between scaled input power and output power of the optical amplifier, and a regulator which generates a bias and correction signal that reduces the error signal to at least substantially zero. An adder adds the signal from the feed-forward path and the bias and correction signal from the regulator to form a pump control signal which maintains a desired gain of the amplifier.

Through the feed-forward path, the control circuit is able to quickly generate an injection current for maintaining amplifier gain without the need for permanently increased pump power that occurs in conventional circuits. Also, gain sag is eliminated because the input power used to form the pump control signal increases the impulse response of the regulator, which in turn provides an almost completely ideal control or pump waveform that offsets the impact of sudden fluctuations in input power.

In accordance with a second embodiment of the invention, the regulator may include an integration signal path for integrating the error signal output from the subtractor for implementation of both the bias function and a part of the correction function, and a proportional amplification signal path that independently amplifies the error signal by a predetermined amplification factor. An adder circuit is then used to add the amplified error signal from the amplification path and the integrated error signal from the integration path to form the bias and correction signal. The amplification signal path includes a differentiator which differentiates the error signal, a multiplier which multiplies the differentiated error signal by the predetermined amplification factor, and an integrator which integrates the multiplied signal from the multiplier. Preferably, the amplification factor is derived from the input power signal.

The integration signal path includes a multiplier, which multiplies the error signal by another or the same predetermined amplification factor, and an integrator which integrates the multiplied signal from the multiplier. These regulator circuits optimize the response speed and stability of the amplifier to minimize any deviations from the optimum constant-gain behavior, without interfering with the fast, feed-forward path control.

In accordance with a third embodiment of the invention, the regulator may include the above-mentioned integration signal path and the proportional amplification signal path. The amplification signal path may include a multiplier which multiplies the error signal by the predetermined amplification factor. Preferably, the amplification factor is derived from the input power signal. The integration signal path includes a multiplier, which multiplies the error signal by another or the same predetermined amplification factor, and an integrator which integrates the multiplied signal from the multiplier. These regulator circuits optimize the response speed and stability of the amplifier to minimize any deviations from the optimum constant-gain behavior, with low interference to the fast feed-forward path control.

In accordance with a fourth embodiment of the invention, the gain control circuit includes a non-linear amplifier which provides a saturating gain after the adder circuit but before the pump laser. To re-implement the linear behavior of the forward path, an amplifier with reverse non-linearity is positioned between the input and the adder. Through these additional amplifier circuits, the control circuit of the invention compensates for optical amplifier response changes that may adversely affect stability, which would impeded a fast adaption to changing input power.

In accordance with a fifth embodiment of the invention, a pair of non-linear amplifier compresses the signals before the subtractor in order to adjust the overall regulator behavior to the changing amplifier response behavior allowing a fast adaptation of the amplifier to changing input power. Another non-linear compressing amplifier may be placed after the subtractor before the regulator for speed and stability improvement of the control circuit.

BRIEF DESCRIPTION OF THE DRAWINGS

FIG. 4(a) shows the magnitude of a response of the amplifier, FIG. 4(b) shows the inverse of the magnitude of a regulator response, FIG. 4(c) shows both curves if the circuit is optimized maintaining stability for all input powers, and FIG. 4(d) shows the regulator response optimized for each amplifier input power separately.

FIG. 11(a) shows a full range of input powers, and FIG. 11(b) shows an exploded close-up view of the low input power range.

DESCRIPTION OF THE PREFERRED EMBODIMENTS

The present invention is a control circuit and method for regulating the gain of an optical amplifier. The control circuit is ideally suited for use with pre-, post-, and line-amplifiers in optical transmission systems to ensure that multichannel amplification occurs with stable gain, low cross-talk, and low bit-error rates. Those skilled in the art will appreciate that the control circuit may be used in other optoelectronic applications including but not limited to local-area and campus networks, metropolitan area networks, long haul and ultra-long haul networks, video distribution systems, and lightwave broadcast transmissions.

Figure 3:
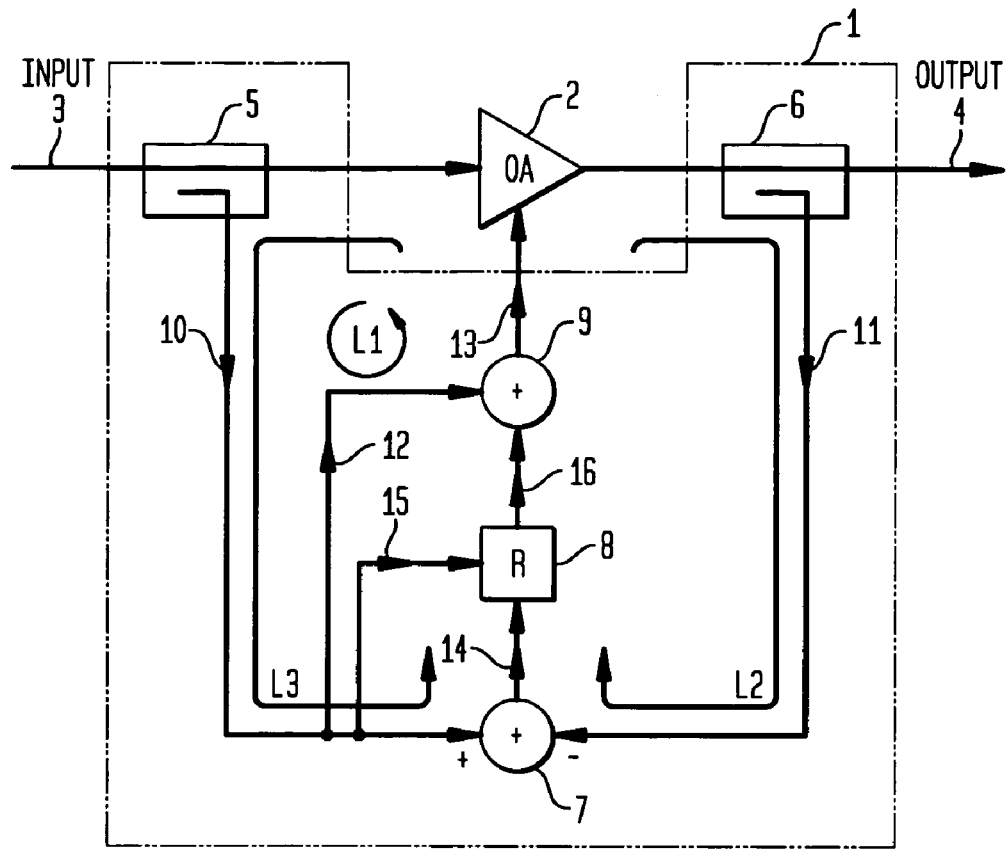
FIG. 3 is a block diagram of a first embodiment of a gain control circuit in accordance with the present invention, including a feed-forward path and regulator optimized in a predetermined manner depending upon optical amplifier input power.

Referring to FIG. 3, a first embodiment of the control circuit of the present invention includes a control unit 1 connected to an optical amplifier 2. Preferably, the optical amplifier is a fiber amplifier which uses one or more pump lasers to input excitation light of a predetermined wavelength into a rare-earth doped fiber, for example erbium doped. In a telecommunications application, the excitation light of the pump laser is typically 980 nm or 1480 nm while the fiber typically operates in a range of wavelengths around 1550 nm. Of course, other wavelength ranges are possible.

Alternatively, the amplifier may be a laser-diode amplifier. In order to ensure stable operation, the control circuit of the present invention regulates the injection current into the pump laser. In a doped optical fiber amplifier the regulation contrasts one or more driving currents, and in a laser diode, to maintain a constant gain. This constant gain is maintained despite fluctuations in input signal power and channel loading. Other applicable amplifiers may be Thulium- or Praseodymium-doped fiber amplifiers, optical waveguide amplifiers, integrated amplifiers, and maser amplifiers. If a maser amplifier is used, its microwave signals correspond to the optical signals described herein. For purposes of convenience, the balance of the discussion will be given with respect to a fiber amplifier.

The control circuit of the invention includes an input power monitoring unit 5, an output power monitoring unit 6, a difference stage 7, a regulator circuit 8, and an adder circuit 9. Together, these elements form a feed-forward loop L1 and a combination of a feedback loop L2 and a feed-forward loop L3 which control the power of the pump laser to achieve and maintain a desired amplifier gain. If desired, the present invention may control multiple pump lasers so as to operate them at constant power or pump current. In the multiple pump laser configurations, some of the pump lasers may share pump power control, but at least one of them is controlled. As will be described in greater detail below, a single pump control signal (e.g., reference numeral 13) is used to determine the power of all pump lasers used. The input power monitoring unit 5 generates a signal 10 which is proportional to the power of an optical signal conveyed on input fiber 3. The input power monitoring unit may be of any conventional type, such as a combination of a directional coupler, a photodiode, and a transimpedance amplifier.

The output power monitoring unit 6 generates a signal 11 proportional to the power of an optical signal output from the amplifier. Preferably, the output power monitoring unit is a type which measures only the power of the amplified input signal, i.e., excludes power attributable to amplified spontaneous emissions (ASE). ASE acts as optical noise having a constant average power in the amplifier output. The output power monitoring unit may achieve this using a correction circuit (not shown), located preferably within or adjacent the output power monitoring unit. This correction circuit would subtract a constant offset value corresponding to the ASE noise power from the output power signal. The correction circuit may be any type, conventionally known, including a single resistor tied to a constant voltage which functions to subtract current through a transimpedance amplifier. Alternatively, the correction circuit may be placed in different locations and the offset value may be varied, as described later.

The difference stage 7 generates an error signal 14 indicative of a difference between the scaled input power signal and the output power signal. More specifically, this error signal provides an indication of the correctness of the pump power of the amplifier, i.e., the degree to which the actual gain of the amplifier deviates from a desired, substantially constant gain. This may be further explained with reference to equation (1) which sets forth the relationship of the input power $P_{in}$ and the output power $P_{out}$, the desired gain level, $G_{target}$ and the error signal, err:

$$\text{err} = G_{target} \cdot P_{in} - P_{out} = (G_{target} - P_{out}/P_{in}) \cdot P_{in} \quad (1)$$

From the above, it is evident that when the actual gain of the optical amplifier ($P_{out}/P_{in}$) approaches the desired gain $G_{target}$, the error signal (err) output from the difference stage approaches zero. However, as the actual gain of the optical amplifier deviates from the desired gain $G_{target}$, which may occur, for example, as a result of a change in channel load or input power, equation (1) shows that the error signal err moves away from zero. The amplification in the path from the optical input to the subtractor 7 along loop L3 must be larger than the gain from the optical output to the subtractor 7 along the loop L2, the ratio of both being the desired gain $G_{target}$. The error signal from the difference stage provides an indication of the gain deviation which is taken into consideration in adjusting pump power.

The regulator 8 generates a steady-state pump bias and high-speed correction signal 16 based on the error signal. It does so by amplifying the error signal as much as possible, while keeping the overall circuit stable, in order to adjust the output of the optical amplifier in a direction that minimizes the error signal. Moreover, the error signal acts to reduce the gain when the gain is too high, which reduces the output of each of the regulator, the pump signal and the amplifier gain until the amplifier gain reaches the desired value. In steady-state operation, the bias signal output from the regulator reduces the error signal to (substantially) zero.

More specifically, the regulator has such a high gain that it produces an output that will effectively reduce its own input, i.e. the error signal. Assuming the feedback circuit is stable, the high gain of the regulator quickly changes the state of the system when the regulator does not produce the right output signal and the input error signal deviates slightly from zero. In this context, "stability" means that deviations from steady state will decay in time. In this way, therefore, the bias signal output from the regulator reduces and maintains the error signal at a value close to zero.

One characteristic of the optical amplifier 2 is that it becomes slow and non-responsive at low input power, and tends to overshoot at high input power. The regulator is adapted to respond dynamically to this amplifier behavior. More specifically, the path from the pump control input to the amplifier output (the "pump path"), which is the part of the amplifier that shares the feedback loop L2, has the following dynamic behavior. At high input power, the pump power defines the output power. At low input power, there is less power to be amplified. Therefore, the output power, and consequently the output power variation, is lower, even at the same varying pump levels. In this way, the small-signal gain of the pump path is lower.

Further, it should be noted that the temporal response behavior of the pump path optical amplifier is dynamic. In particular, the pump path has a general, low-pass characteristic since the pump light generates electrons in the upper lasing level of the lasing transition used for optical amplification, and these electrons are stored in this upper level. At low input power, the time constant of the low-pass is basically given by the intrinsic lifetime of electrons in the upper level, e.g., for Erbium-doped amplifiers approximately 1 to 10 ms. At high input powers, the lifetime of electrons in the upper level is lower because of the additional probability that the electrons will go to the lower level by stimulated emission. Hence, the lifetime is shorter and the pump path has a lower time constant.

In selecting the gain of the regulator, it is preferable to have infinite gain at zero frequency. This reduces the error signal to zero in steady state operation of the regulation. A simple implementation of this behavior is a PI regulator including a proportional part and an integral part, as described below in equation (2). In this relationship, $R_{out}$ is the signal output from the regulator, which corresponds to an injection current to the pump laser that will adjust the pump so that $G=P_{out}/P_{in}$; a is a design that describes the gain of the proportional part; b is a design parameter, a constant that describes the gain of the integral part, and err is the error signal output from the difference stage, which is the input to the regulator.

$$R_{out} = a \cdot \text{err} + b \cdot \text{integral over time(err)} \quad (2)$$

In Equation (2), the parameters a and b may be increased nearly up to the instability limit of the control circuit, as readily recognized by those skilled in the arts of control theory or electronic circuit design. See, e.g., *Electronic Circuits: Design and Applications* by Ulrich Tietze, Christopher Schenk, E. Schmid. In practice, parameter b is held at zero while parameter a is increased until there is some overshoot in the $R_{out}$ response, somewhat below the desired overshoot limit. Then, parameter b is increased in order to minimize the steady-state error, until a small change in overshoot occurs, which provides the desired overshoot behavior. This process may be applied to the circuit at any input power.

The loop L2 contains the pump path of the optical amplifier 2 including pump driver circuits, the output power monitor circuit 6, the regulator 8, adder 9, and some electronics part thereof (not shown). In order to dimension the regulator, all parts of the loop, except the regulator, have to be examined, i.e. the amplifier pump path plus other opto-electronics and electronics.

Figure 4A:
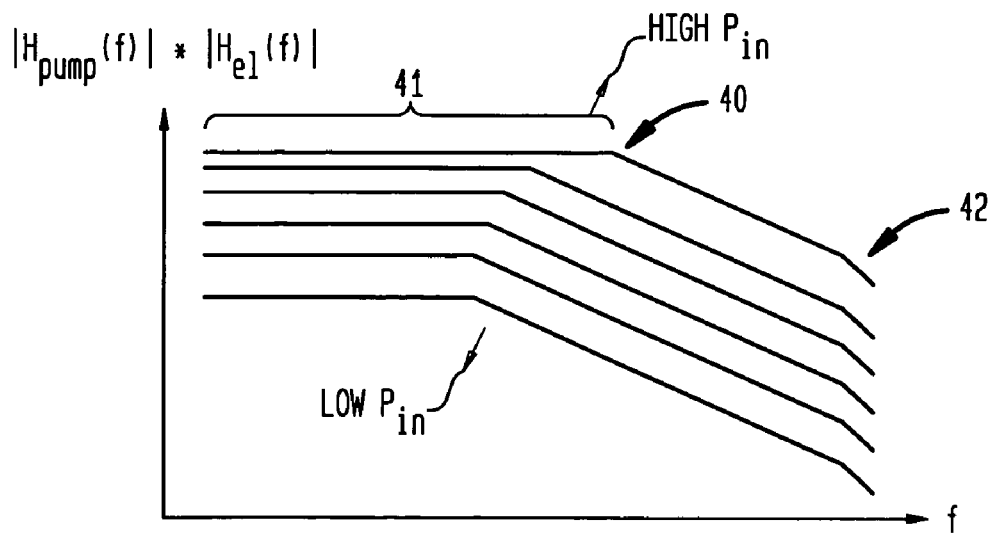
FIGS. 4(a) to 4(d) are graphs showing, in a schematic way, a determination process of stability in accordance with the control circuit of the present invention. In particular.

FIG. 4(a) shows the magnitude of the dynamic response of the amplifier pump path and the other electronics ($H_{pump}(f) \cdot H_{el}(f)$) as a function of frequency. Each response curve within the array of responses represents the amplifier's operation at a different optical input power. It is a FIG. 4 shows these dynamic response in a schematic plot in double logarithmic scale. The first-order low-pass behavior of the optical part of the amplifier is illustrated at lower frequencies indicated by the first response and first knee 40 at low frequency portions 41 of the amplifier response. In fact, the first-order low-pass behavior does not limit stability because it changes the phase by a maximum amount of $\pi/2$, or 90 degrees. When increasing the frequency until a roundtrip gain of unity is reached, the roundtrip phase must not exceed a multiple of $2\pi$ or 360 degrees. Here, it is meant that all signal sign changes are included in the phase by a $\pi$ or 180 degrees phase shift, as e.g. the sign change introduced in the definition of err. As a result, stability is limited by additional phase shifts in the loop L2, i.e. by propagation delay and by electrical bandwidth limitations. These phase shifts are generally negative (delaying).

The phase in the part of loop L2 under consideration reaches the critical value $-\pi$+phase margin (minus 180 degrees plus phase margin) at a certain frequency, typically very high frequency in the MHz range. In FIG. 4(a), that frequency is shown as a second knee 2 in the amplifier response. To maintain stability at a partial frequency, the loop gain, which is the round-trip gain of all elements around loop L2, must be below unity at that frequency. The process of finding the point of unity loop gain can be visualized by overlaying the inverse of the regulator response curve to the amplifier gain. The intersection of the two define the frequency at which unity loop gain is achieved.

Figure 4B:
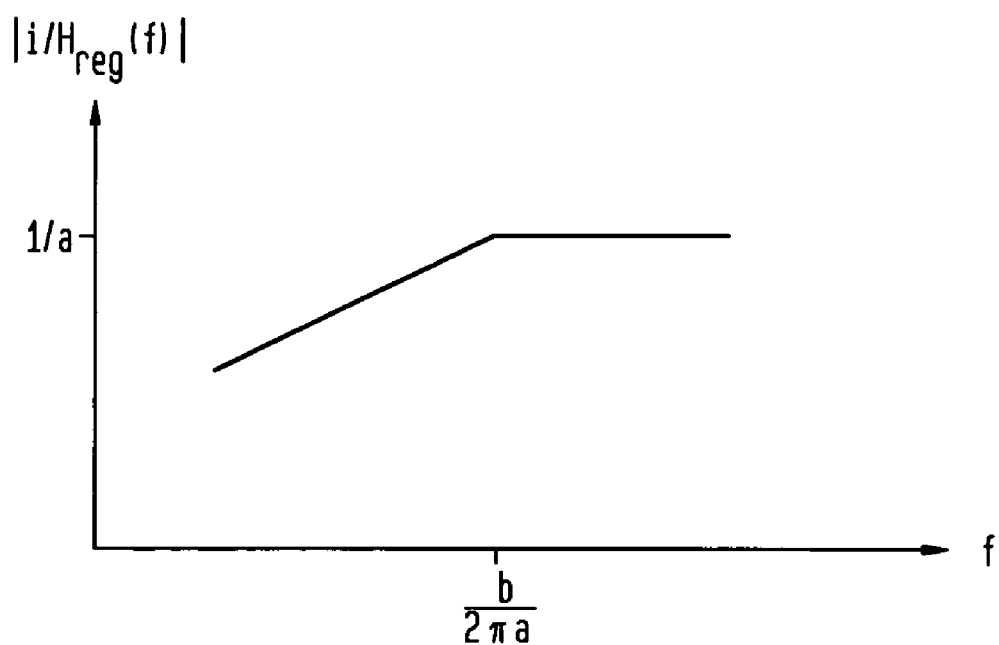

FIG. 4(b) shows an example of the inverse of the regulator response. Again, the inverse has been graphically illustrated because it provides an easy way to determine the frequency at which unity loop gain is reached by overlying the amplifier gain curve with the inverse regulator gain curve. The regulator response shows a corner frequency at $$\frac{b}{2\pi a},$$

below which a $\pi/2$ or 90 degrees phase shift is displayed. Because of this phase shift, stability feedback stability requires that the knee of the regulator response occur at a frequency less than or equal to the first knee of the amplifier response.

Figure 4C:
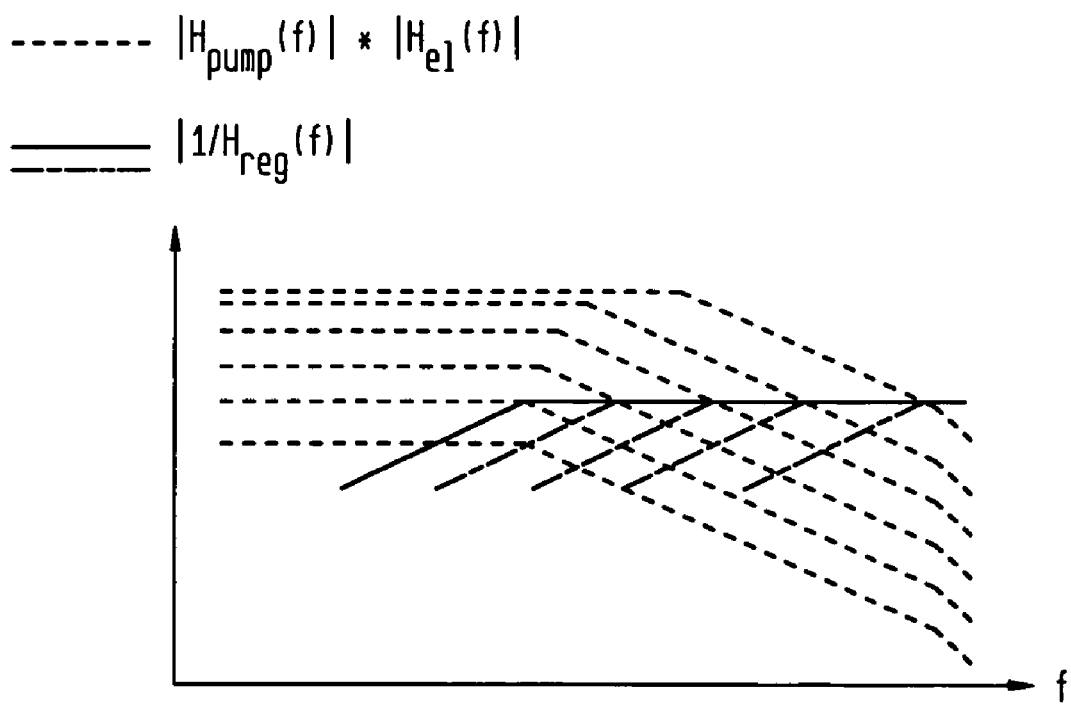

FIG. 4(c) shows the regulator curve (solid) with the most quickly regulated control response (i.e. achieves steady-state) stable response, for all amplifier input powers, overlayed on amplifier response curves (dashed). The optimization of parameter b (from equation 2) for each input power are indiated by the dash-dotted lines further overlayed on the photo of FIG. 4(c). Only the frequency response portions up to the knee are provided since stability is only insured at all input powers below the knee. Interestingly, the parameter b is defined by the worst case which occurs at an intermediate power level.

Figure 4D:
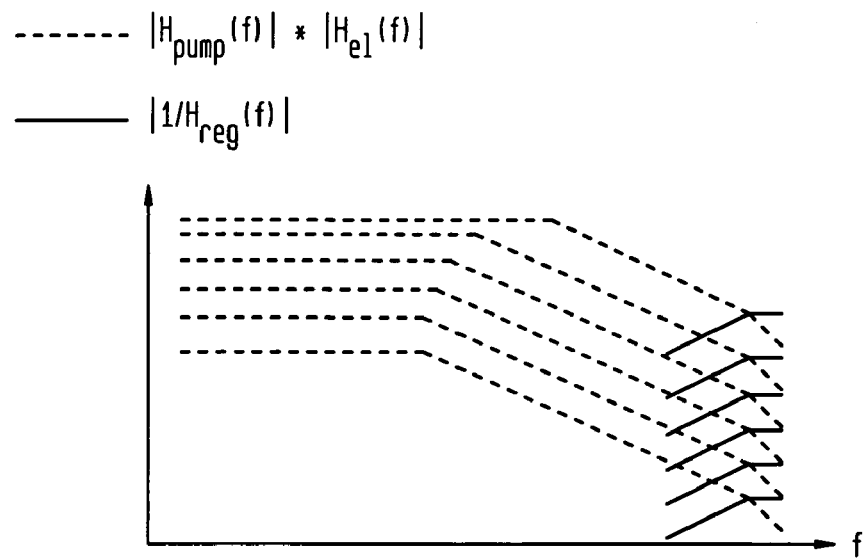

In contrast, FIG. 4(d) shows a family of regulator response curves in which regulator parameters a and b are adjusted optimally for each input power value case. Note that the regulator circuits represented by a single curve among them provide stability only at one corresponding input power. Also, it is not viable to dynamically adjust parameter b directly as a function of input power because this would introduce an additional response path from the input power monitor signal to the regulator output, which would provoke a wrong pump signal followed by deviations of the optical amplifier gain at sudden changes of the input power.

Comparing FIG. 4(d) to FIG. 4(c) shows that at medium and low input powers the unity gain frequency is orders of magnitude higher than in the former case. That frequency is a measure for the speed of the control response. Even at high input powers, there is the advantage that the bias adjustment is orders of magnitude faster.

Figure 1:
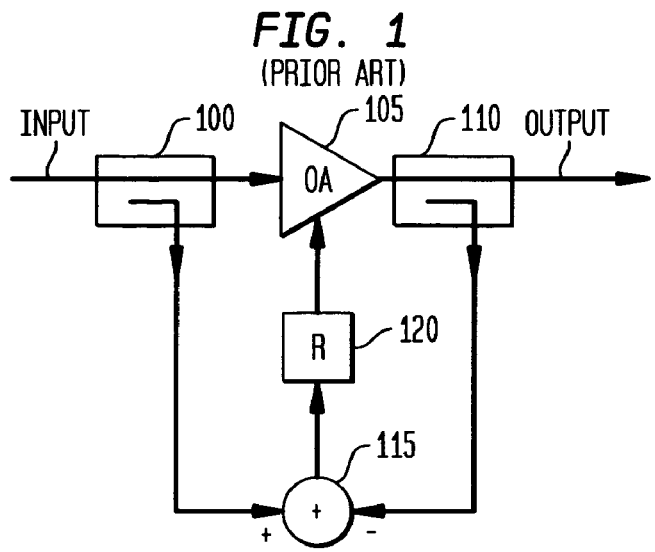
FIG. 1 is a diagram of one approach that has been proposed for controlling the gain of an optical amplifier. This approach lacks the particular feed-forward path of the invention and uses a non-optimized regulator.

Referring back to FIGS. 1 and 3, the input amplifier power information is conveyed by signal path 15 to the regulator in order to provide the compensation response exemplified in FIG. 4(d). Additionally, the pump power may influence the dynamic response behavior of the pump path. The pump current or a pump power feedback signal may be used to optimize the regulator further. However, these efforts are secondary for erbium-doped amplifiers and are not shown in the accompanying figures.

Figure 5A:
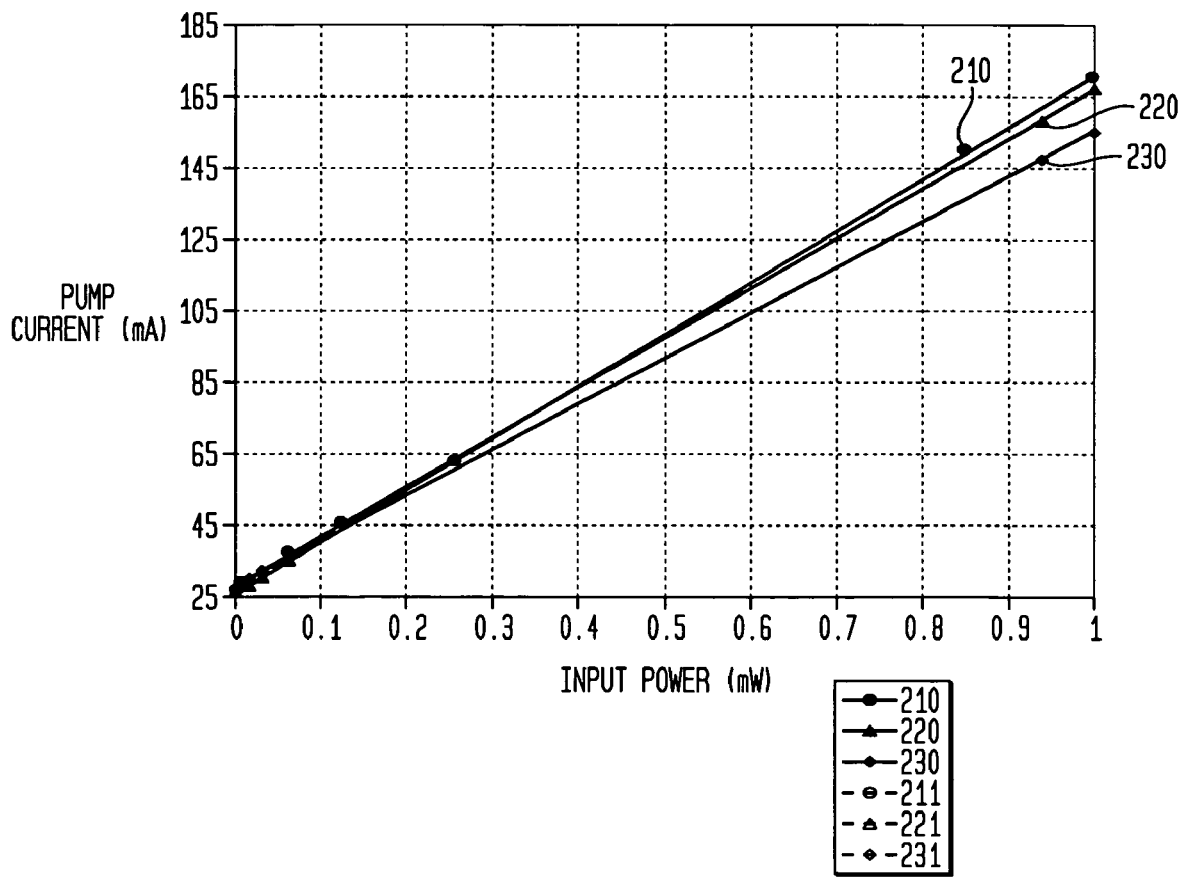
FIGS. 5(a) and 5(b) are charts showing measured static properties of three individual optical amplifiers held at constant gain. In particular.
Figure 5B:
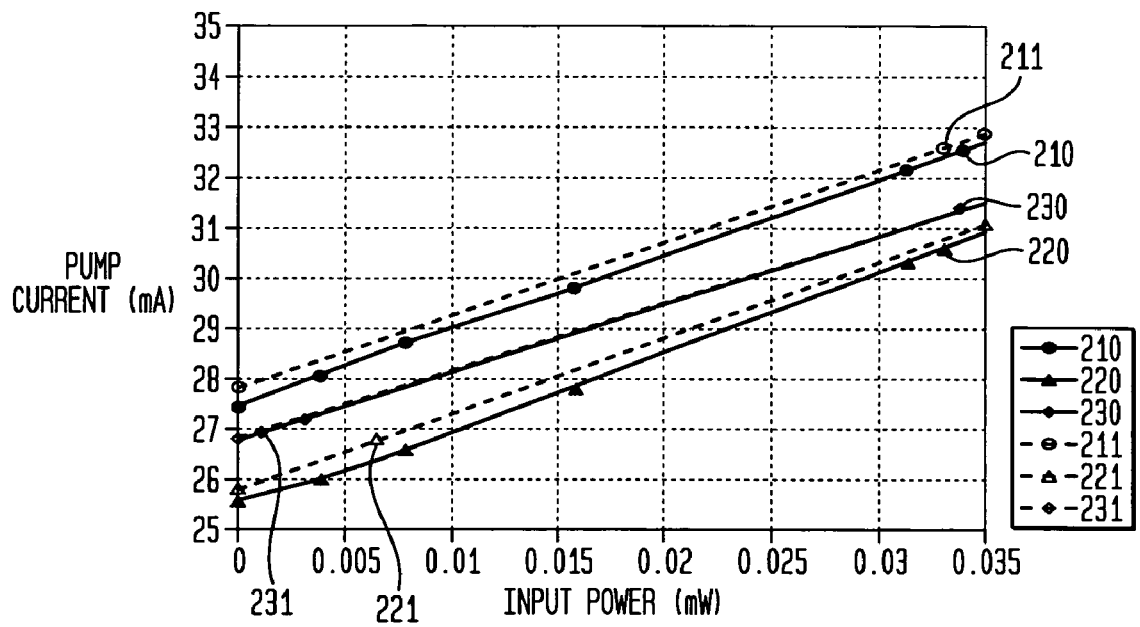

The remaining input to the optical amplification system apart from the parameters, is the input power. Thus, the amount of pump power or pump current necessary to amplify the optical input signal is predictable given that the desired gain is a function of the input power. This function has been empirically investigated through measurements on three amplifier samples. The results of these studies are shown in FIGS. 5(a) and 5(b).

For each amplifier input power level, the pump current characteristics can be measured by adjusting the pump current until the measured optical gain meets the desired value and the receiving the results. FIG. 5(a) shows this relationship for three individual amplifiers, identified by numbers 210, 220, 230. The curves show near ideal linear responses. To assess the quality of the linearity, approximating straight lines 211, 221, 231 have been added to the plot as dashed lines. The fit between the approximations and actual responses is so good that the measurement data can hardly be distinguished from the approximation lines. FIG. 5(b) is an expanded view of the low-power region shown in FIG. 5(a). As shown in FIGS. 5(a) and 5(b) the relationship between the necessary pump current and the optical amplifier input power is linear for these amplifiers.

Figure 6A:
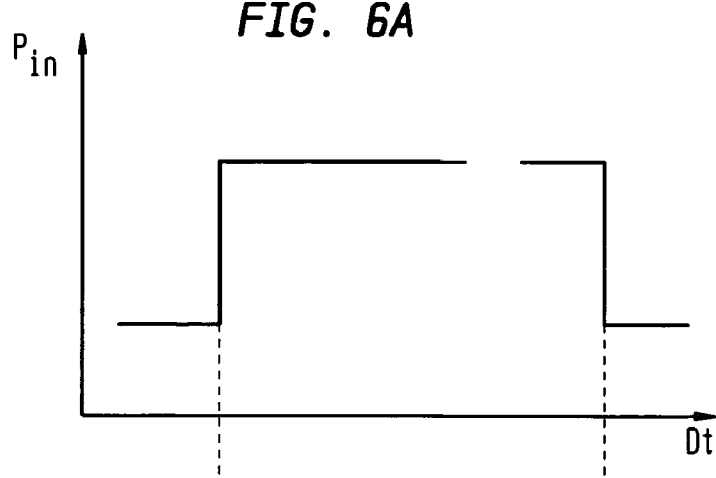
FIG. 6 is a graph showing the step response of the gain control circuit of the present invention.
Figure 6B:
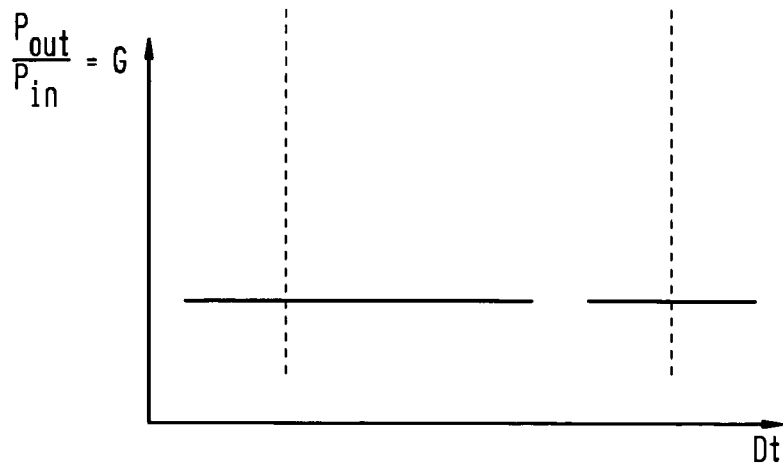

Referring to FIG. 3, the adder circuit 9 adds the bias and correction signal output from the regulator to the input power signal, which has been fed forward from the input power monitoring unit along optical path 12. The sum of these signals produces an injection current corresponding to pump control signal 13, which causes the optical amplifier to achieve the desired gain with respect to the output power signal, i.e., which causes the error signal in equation (1) to be substantially zero. If the electrical paths 10, 12, 13 are designed with the correct gain, corresponding to the slope of the response shown in FIG. 5, the only remaining function of the regulator 8 is to provide a bias signal. As the amplifier dynamic response is almost ideal by only the dynamics in the feed-forward path 12, impaired only by high-frequency limitations in paths 10, 12 and 13. The nearly ideal behavior is illustrated in FIG. 6 and described in greater detail below.

Alternatively, the regulator output signal done is sufficient to control the pump laser, without the feed forward signal shown in path 12, particularly if the regulator is optimized. However, with this arrangement, the amplifier response can never be faster than the time delay between the input and output optical signals. By implementing path 12, the amplifier response speed can be doubled, using a regulator optimized for each input power, and even further improved using a sub-optimized regulator.

Both of these methods, i.e., using the feed-forward path 12 with adder 9, and using a regulator that is optimized for each input power, independently and substantially improve the speed of the control circuit. Either of the methods may be applied independently, thereby improving the capability of the control circuit to quickly reduce the gain error. However, the optimal performance may be achieved by the simultaneous application of both methods.

Generating the pump control signal in the manner described above allows the control circuit of the present invention to achieve a number of advantageous over conventional control circuits. First, the control circuit of the invention is able to exceed the operational threshold of the amplifier with substantially less pump power than conventional circuits. This is because the control circuit of the invention feeds the amplifier only with the pump power that it needs. This is in contrast to conventional control circuits which over-feed pump power to the amplifier and then dispense of the waste energy from the transmission fiber, into the amplification of a link control signal, or into the generation and sustainment of an oscillation signal.

Figure 2A:
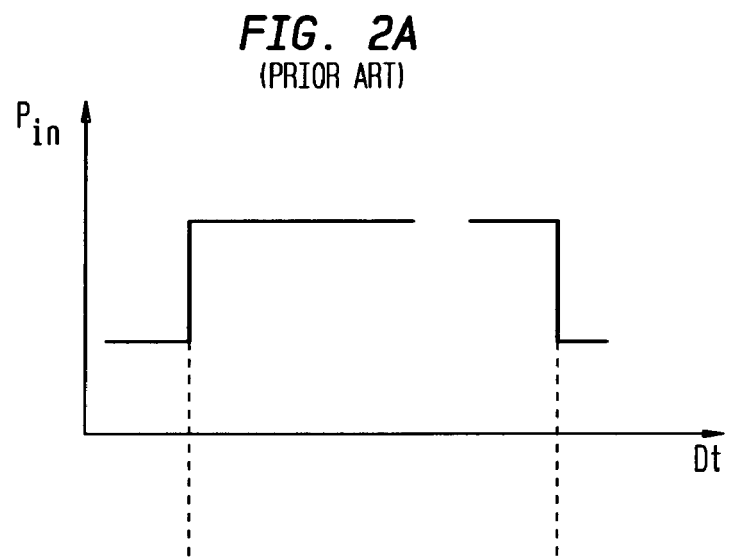
FIG. 2 is a graph showing the step response of a conventional amplifier gain control circuit.
Figure 2B:
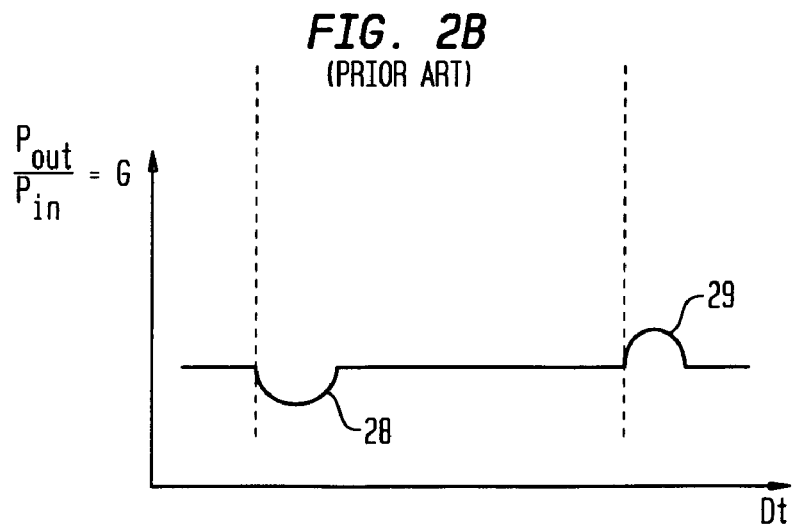

Second, generating a pump control signal based on a sum of the input power signal and regulator bias signal prevents sag in the amplifier gain, which has proven to be a significant drawback of many conventional amplifier control circuits. The slow response time of this loop causes the gain of the amplifier to sag especially after a sudden input power increase. This condition is graphically depicted in FIG. 2, which shows a typical impulse response curve for the conventional control circuit.

By generating the pump control signal from a sum of the input power signal and the regulator bias and correction signal, the gain control circuit of the present invention achieves a much faster impulse response than conventional circuits. With this faster response, the pump power of the amplifier may be instantaneously adjusted to compensate for increases in input power, thereby preventing sag and bump conditions from occurring as exemplified in FIGS. 2(a) and 2(b). This allows the amplifier to be controlled in a timescale of around one microsecond instead of hundreds of microseconds.

Figure 7:
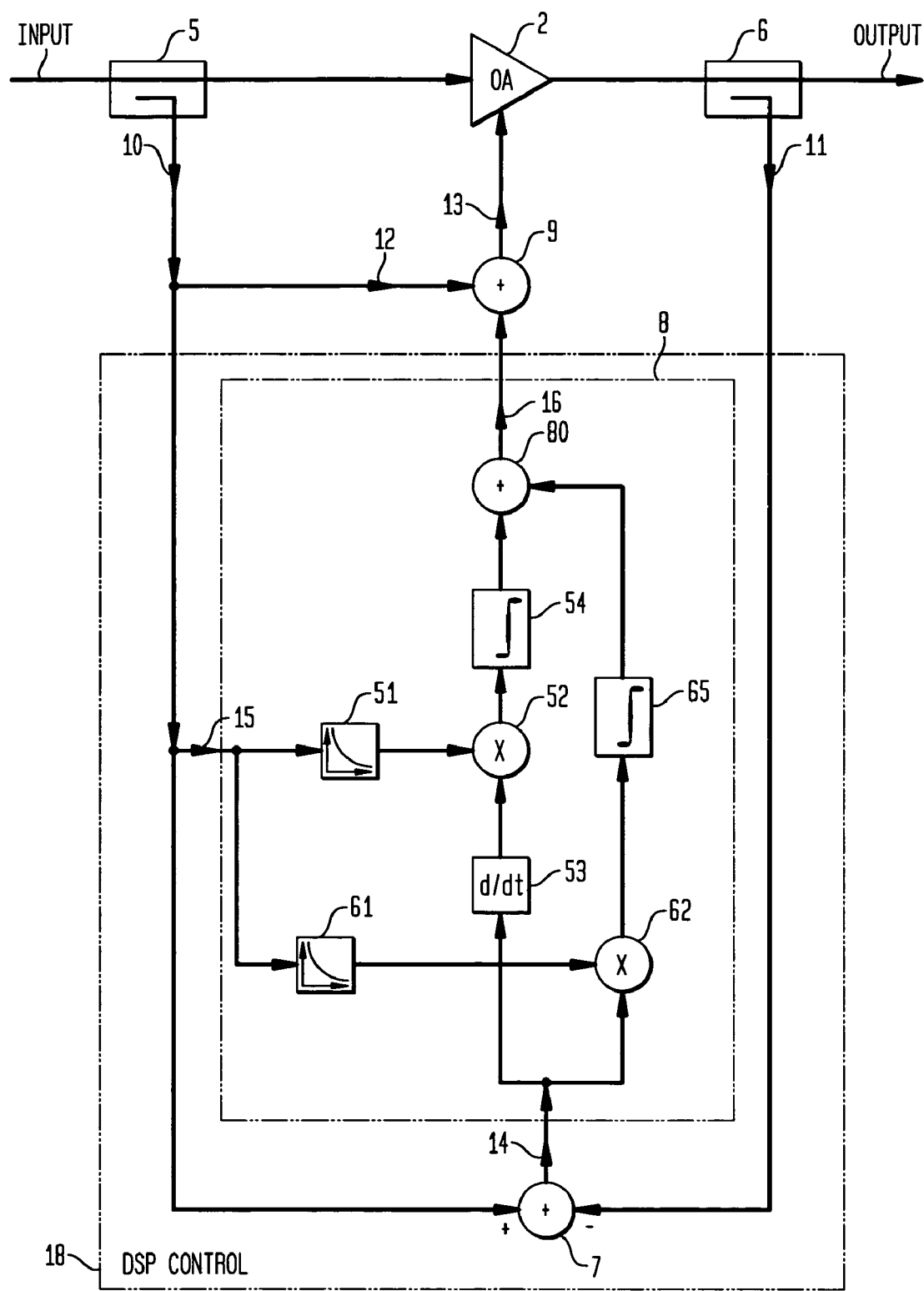
FIG. 7 is a diagram showing one embodiment of the regulator circuit of the present invention with a proportional amplificaton path and an integration path. The amplification path contains a differentiator and an integrator.

Referring to FIG. 7, another preferred embodiment of the regulator of the present invention is provided and includes an expert circuit that optimizes the time behavior of the regulator. With the expert circuit, the regulator is able to quickly generate a bias signal for maintaining a desired amplifier gain irrespective of large or sudden fluctuations in input power, as well as provide compensation for the aging and temperature sensitivities of the amplifier.

In the regulator of FIG. 7, the error signal 14 output from the difference stage 7 is conveyed along two signal paths. The first path is a path of proportional amplification which includes a differentiator 53, a multiplier 52, and an integrator 54. This path essentially causes the amplification path of the regulator to output an amplified version of the error signal. The second path is an integration path which integrates the error signal using multiplier 62 and integrator 65. The signals output from the amplification and integration signal paths are added in adder circuit 80 to produce output signal 16 of the regulators. This output signal is a steady state bias and correction signal for the pump laser which cuts to reduce the error signal 14 from the difference stage to zero. The processing performed along each signal path will now be explained in greater detail.

The amplification path of the regulator circuit amplifies a derivative of the error signal by a factor determined by a characterization circuit 51. This amplification factor is proportional to the desired specific gain a of the regulator in equation (2). Assuming that the input power is constant, the sequence of signal processing through differentiator 53, multiplier 52, and integrator 54 operates as a controller amplifier. More importantly, a direct path between the amplifier input power is considered by the output signal 16 from the regulator circuit 8 placing a multiplier 52 between the differentiator 53 and integrator 54. This is because differentiator 53 generates a output signal that has zero which is multiplied to the output signal from characterization circuit 51. Similarly, the integration path of the regulator circuit contains a multiplier 62 which multiplies the error signal 14 by a specific integration factor b. Interpretation factors, as provided in equation 2 is a predetermined function of the optical amplifier input power and is generated by a characterization circuit 61. Once again a direct path from the control signal 15 to the regulator output 16 is minimized since the error signal 14 is small and deviates only shortly from zero. Consequently, characterization signal changes are multiplied with small error signals that are subsequently integrated, thereby distinguishing their effect.

Through the optimized regulator circuit, including amplification and integration, the error signal 14 is reduced substantially to zero, as previously discussed. The amplification factors a and b may be determined in accordance with the process described above using measured, amplifier dynamic response curves. Alternatively, the amplification factor may be determined through a computer simulation including an amplifier model, testing. Additionally, hardware implementation may be used such as by applying step functions to the optical input at low and at high levels and optimizing the response in each case as a tradeoff between a slow response and overshoot both of which bound the optimal response of the amplifier contact circuit.

By way of example, one way the amplification factor may be estimated is by engineering the Bode plot of the open loop, i.e., the loop L2 without the regulator, and then looking at the phase which shall have some margin to $-\pi$ (or minus 180 degrees) such as $\pi/3$ or 60 degrees. The regulator shall have at this point the inverse gain of the rest of the loop. This may be performed for all input powers to thereby obtain the characteristic of circuits 51 and 61 and thus the desired amplification factor point by point. In determination the amplification factor, however, the aging of the pump laser and other components should be taken into account.

Another method of determining the amplification factor is to combine a simulation model that includes the amplifier, characteristics and control electronic characteristics and to simulate the overall response on a computer. Optimum or selected parameters of variations in the hardware implementations may then be tested to determine the optimal response. Hardware tests would then be performed until optimum amplification factors are reached, which are preferably those which will ultimately cause the gain error set forth in equation (1) to be minimized in a quick and stable hammer.

By processing the error signal in the manner described above, the regulator circuit 8 of FIG. 7 is able to output a bias signal which produces a constant gain for the amplifier, despite the short term variations such as fluctuations in input power and long-term variations such as aging and temperature.

In an alternative embodiment of the present invention, the integrators 54 and 65 may be combined and placed in the signal path after adder 80. The mathematical linearity of the integrator operation permits this substitution without significant consequence (not shown).

According to yet another embodiment, part of the control circuit 8 of FIG. 7 of the present invention, is implemented in a digital signal processor (DSP). For example, the circuit 18, depicted in a corresponding dashed frame may be implemented in a DSP including both the proportional path and the integrating path are optimized. Signals entering the DSP are converted from analog to digital formats, and signals output from the DSP undergo a digital to analog conversion. The elements of FIG. 7 which are implemented within the DSP are implemented in a conventional manner, e.g. using standard mathematical and interpolation algorithms that access tabled functions. In a similar way, portions of each of the embodiments provided in FIGS. 3 and 7–12 may be implemented within a DSP. As an advantage, implementation of circuit functionality within a DSP eliminates internal crosstalk problems and allows for the easy replacement systems, even after the final manufacture of the hardware.

Figure 8:
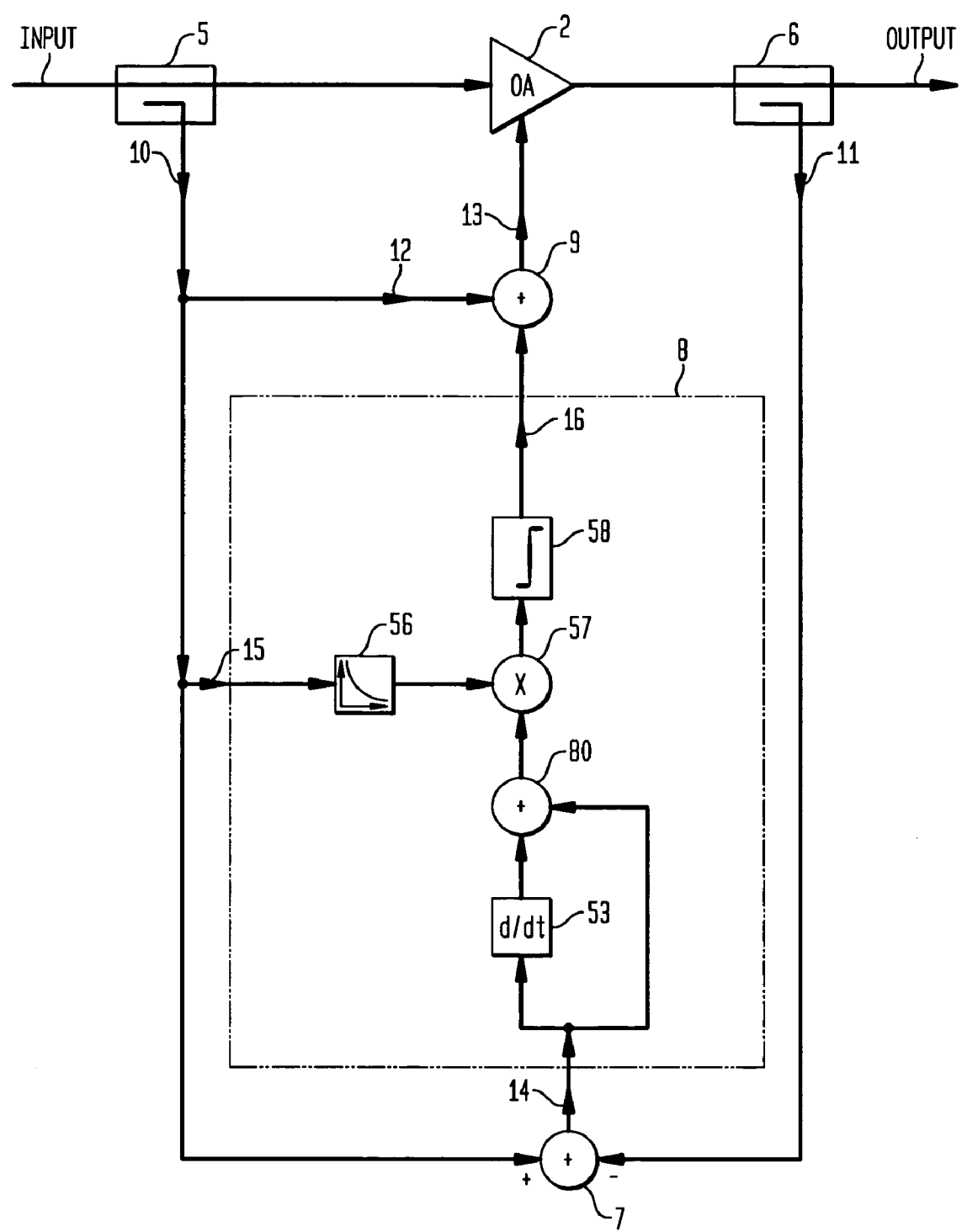
FIG. 8 is a diagram showing another embodiment of the regulator circuit according to the present invention in the case that both amplification path and integration path are using a single characterization circuit.

FIG. 8 illustrates, another preferred embodiment of the regulator of the present invention. In particular, the system of FIG. 7 can be simplified when the characterization circuits 51 and 61 produce an output proportional to each other. This proportionality is suggested by FIG. 4(d). FIG. 4(d) shows a constant corner frequency $$\frac{b}{2\pi a}$$

of the regulator, showing that a and b, both functions of the input power, are proportional to each other. Characterization circuits 51 and 61 of FIG. 7 are represented by circuit 56 in FIG. 8. Integrators 54 and 65 are implemented by a single integrator 58 after adder 80 as previously mentioned according to the distributive law the further multipliers 52 and 62 are implemented by a single multiplier 57 located after the adder 80. The distributive law of multiplication permits this substitution without significant consequence.

Figure 9:
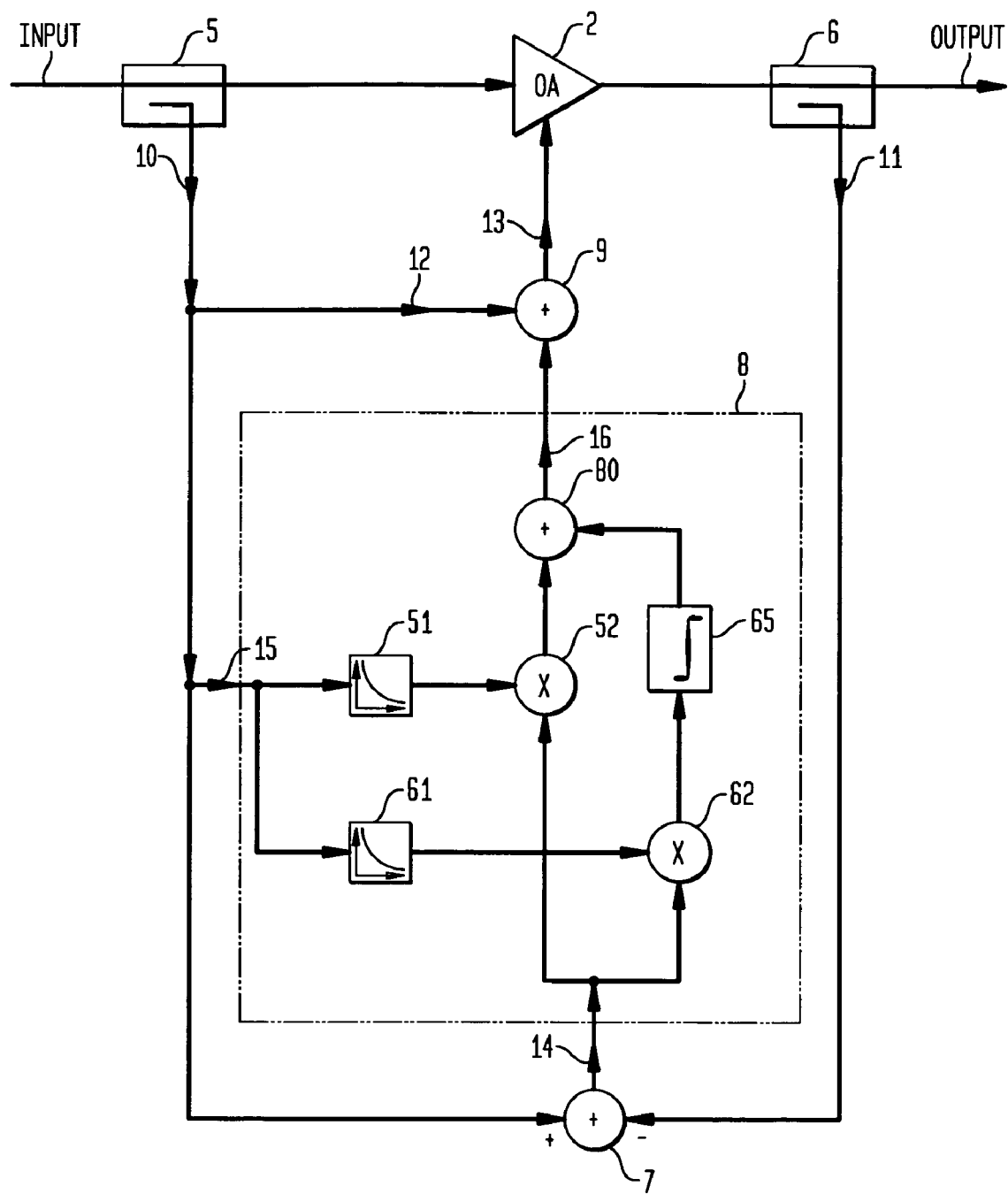
FIG. 9 is a diagram showing another embodiment of the regulator circuit of the present invention.

FIG. 9, illustrates yet another embodiment of the regulator of the present invention. In the system of FIG. 9, the differentiator 53 and the integrator 54 shown in FIG. 7 are omitted. Otherwise, this regulator is optimized in the same way as the circuit shown in FIG. 7. The regulator of FIG. 9 consists of two including feedback/feedforward paths; a proportional amplification path consisting of multipler 52 and an integration path consisting of multiplier 62 and integrator 65. The signals in the amplification path and integration path are combined by the adder circuit 80 to obtain the regulator output signal 16 regulator output signal is a bias and correction signal that quickly reduces the error signal 14 to zero. As previously mentioned, a significant path from the input power monitor signal 15 to the regulator output signal 16 is obviated since the error signal 14 varies only slightly from zero, [an average] then is maintained when multiplied by the outputs of the characterization circuits 51 and 61.

Figure 10:
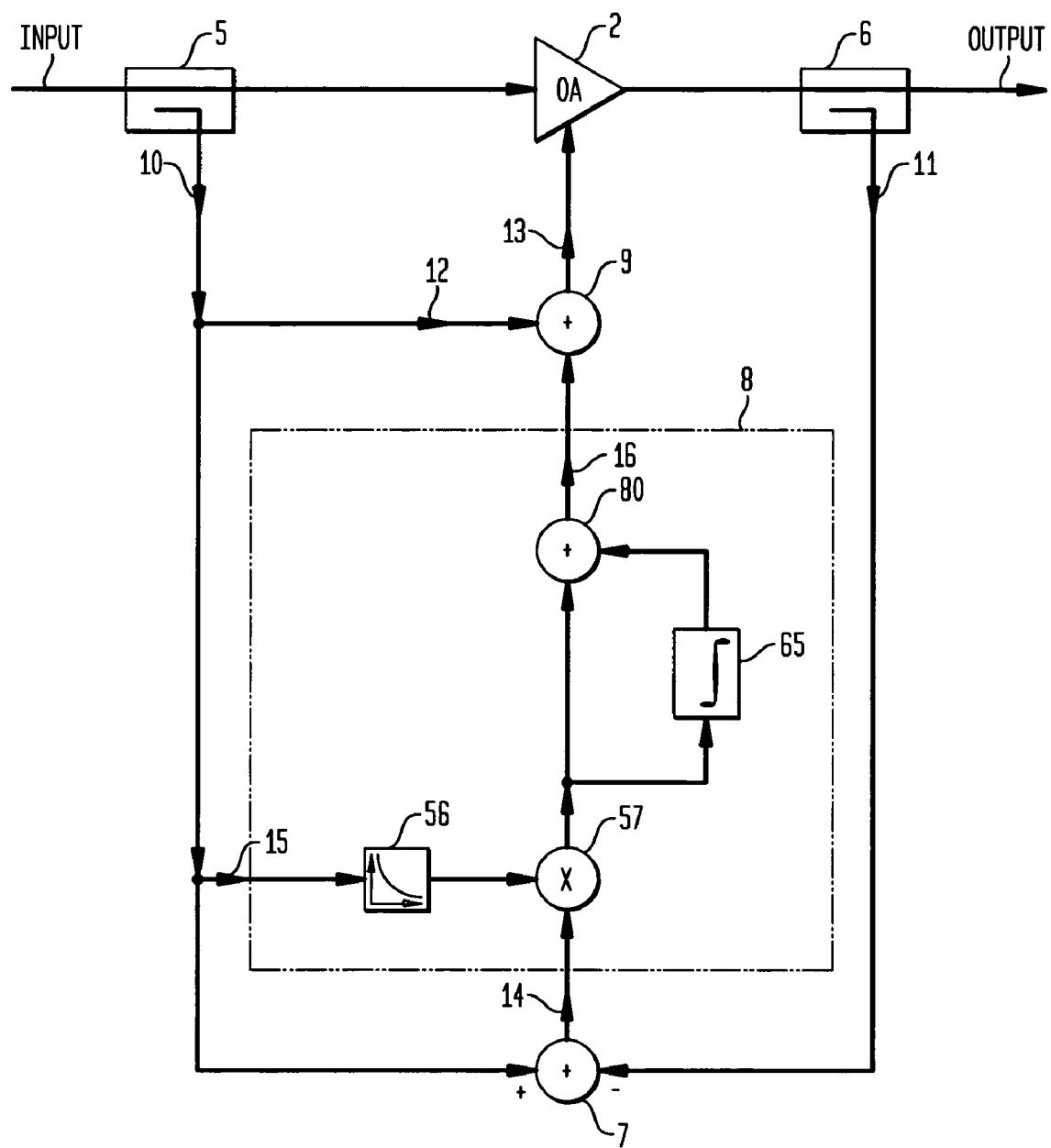
FIG. 10 is a diagram showing another embodiment of the regulator circuit of the present invention in the case that both amplification path and integration path are using a single characterization circuit.

FIG. 10 illustrates another embodiment of the regulator of the present invention. It is in particular, the system of FIG. 10 is a simplification of the system of FIG. 9 including the characterization circuits 51 and 61 produce a proportional output as suggested by FIG. 4(d). In this regard, characterization circuits 51 and 61 are combined to create circuit 56 in FIG. 10, and multipliers 52 and 62 are implemented with a single multiplier 57. If the characterization circuit 56 produces the reciprocal value, the output of multiplier 57 is proportional to the deviation from the desired gain, $G_{target} - P_{out}/P_{in}$, as set forth in equation (3):

$$(G_{target} \cdot P_{in} - P_{out}) \cdot 1/P_{in} = G_{target} - P_{out}/P_{in} \quad (3)$$

The output signal of multiplier 57 in FIG. 10 can be interpreted as a modified error signal which is the input signal of a PI regulator, containing a proportional amplification path and an integration path.

Figure 11:
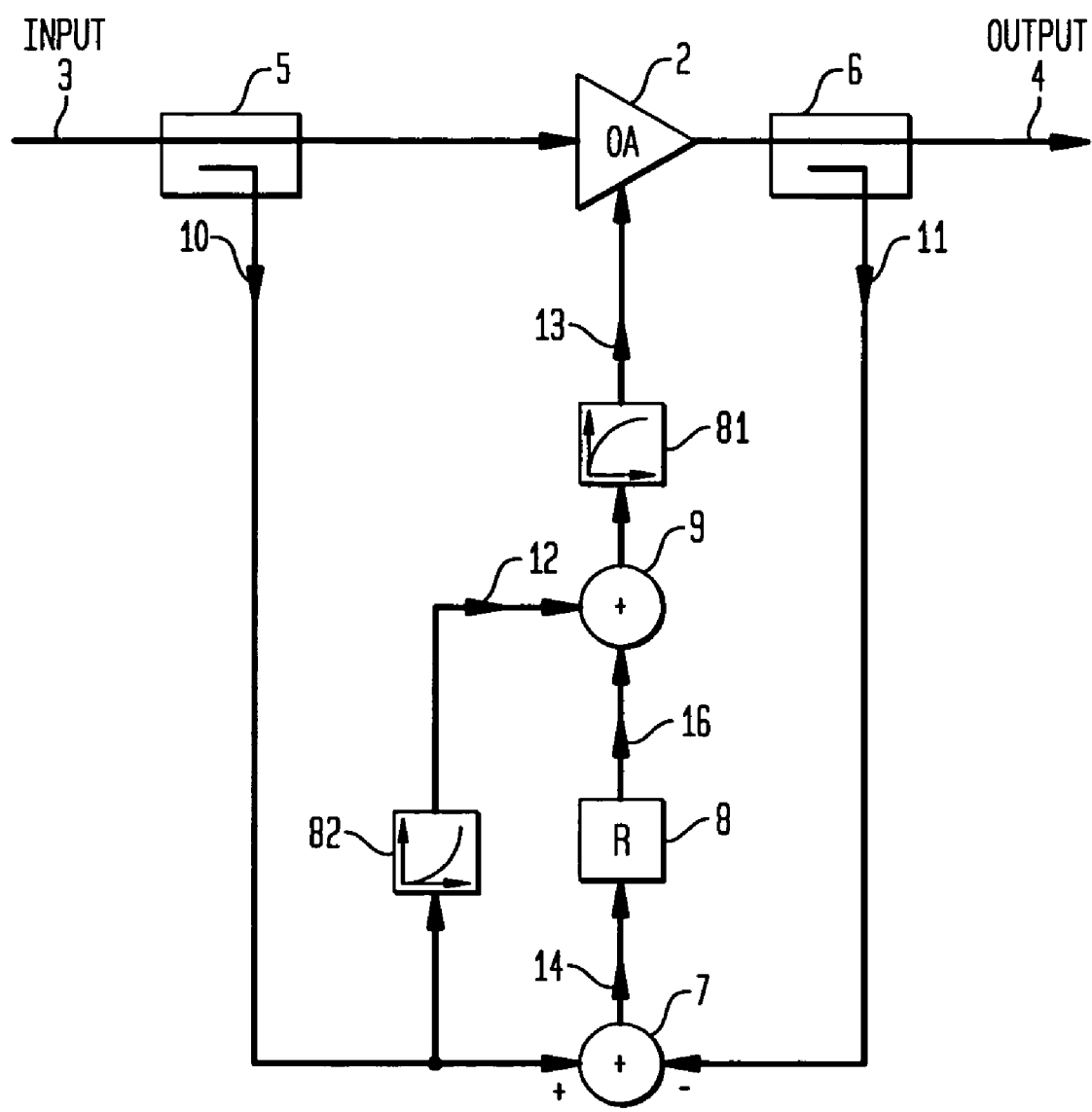
FIG. 11 is a diagram showing another embodiment of a gain control circuit in accordance with the present invention. This embodiment includes a feed-forward path plus non-linearities after the regulator.

FIG. 11 illustrates yet another embodiment of the control circuit of the present invention. This circuit is similar to the embodiment shown in FIG. 3 except that the response of the regulator is modified by a non-linear, compressing amplifier 81. In this embodiment, the response of the regulator 8 is attenuated at higher pump signal levels by a factor related to the derivative of the characteristic of non-linear amplifier 81. The non-linear amplifier characteristic is measured as a function of output signal 13 vis-à-vis the input signal of the non-linear amplifier 81. The resulting regulator attenuation corresponds to an effective decrease of the influence of parameters a and b in equation (2). In an optimal situation, the non-linear amplifier characteristic can by constructed by integrating the differential equation equivalent to the mentioned relation. The linearity of the feed-forward signal is subsequently restored by placing a non-linear amplifier 82 having a complimentary characteristic in the feed-forward path 12.

The amplifiers 81 and 82 can be implemented with either operational amplifiers combined with a diode-resistor network or transistors. Alternatively, the amplifiers may be constructed of mathematical functions or interpolation algorithms operating on look-up tables in a DSP.

Figure 12:
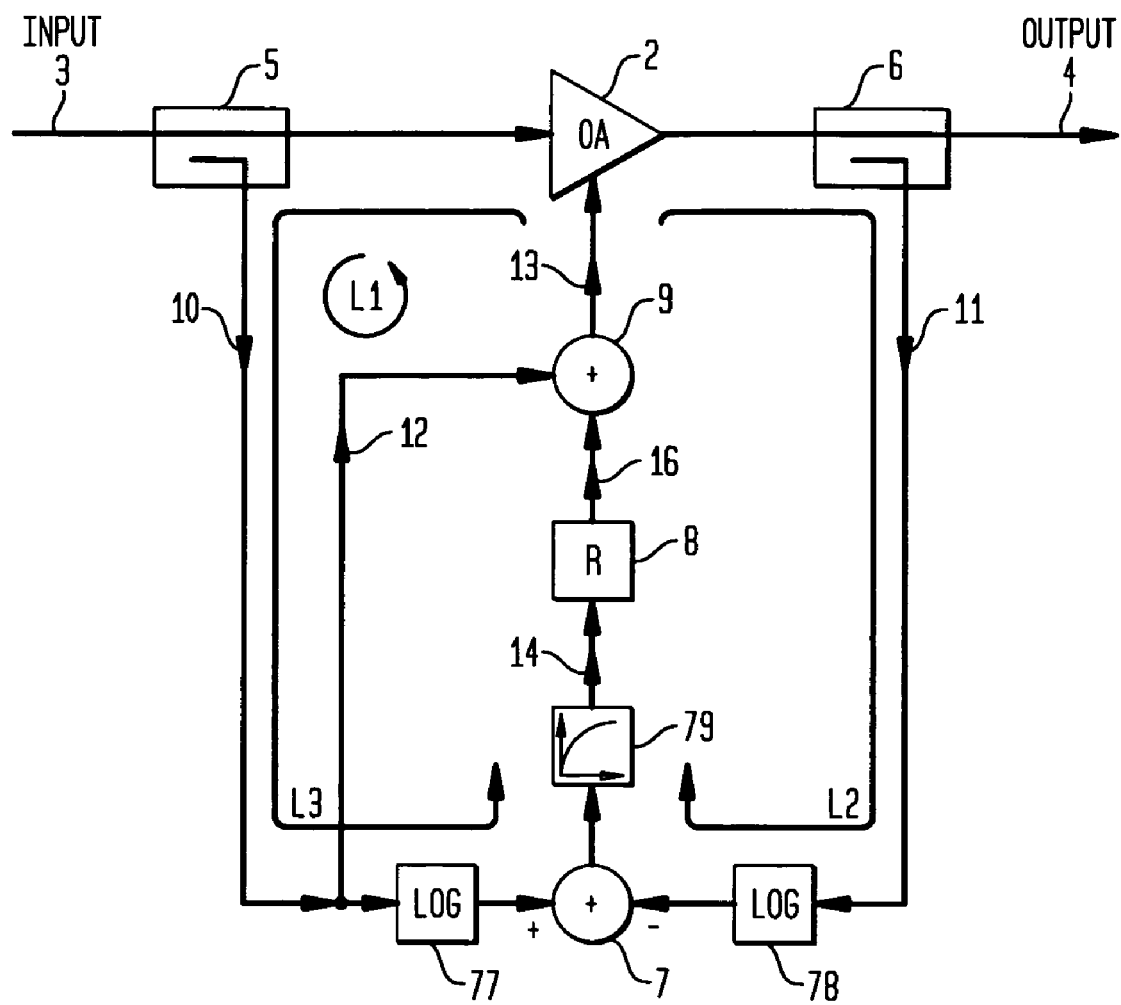
FIG. 12 is a diagram showing another embodiment of a control circuit in accordance with the present invention. This embodiment includes a feed-forward path pluse non-linearities before the subtractor and regulator.

FIG. 12 illustrates another embodiment of the present invention. In this embodiment, the regulator response is modified by a pair of nonlinear circuits at the input of the regulator, more specifically before the subtractor circuit 7. A logarithm circuit 77 and a corresponding logarithm circuit 78 provide for a combined response that adjusts the transfer function to the desired one. This is so even without input power control of the regulator. A nonlinear amplifier 79 may additionally be added to improve the performance. The logarithm circuits are an example of nonlinear elements placed before the regulator. The signals passing through these nonlinear elements undergo an amplification given by the derivative of their characteristic, the characterization, in turn, being a function of the elements' output signal vis-à-vis the input signal. In the case of a logarithm circuit, this derivative is proportional to the reciprocal value of their input power. Since the regulator 8 operates to reduce the error signal 14 to zero, the requestor response is modified by the logarithm circuits in proportion to the reciprocal of the input power signal 10. In general, with a desired regulator response a and b, which are proportional, the non-linear characteristic circuits 77 and 78 can be obtained by integrating the function a as function of the input power.

Without feed-forward path 12 and the non-linear amplifier 79, large deviations of the amplifier output power as compared to the steady-state target value, some possible, resulting in unfavorable control loop behavior. With excessive output powers, resulting in a negative signed corrective loop error signal, the control loop response is too weak, and the time control loop time constant is too long to reduce the output power in an optimal fashion. Alternatively, with insufficient output power, the error signal is too large in magnitude and the control loop may "overshoot" the desired target amplification. The presence of nonlinear amplifier 79 increase the negative signed error signal, and reduce the positive-signed error signal. In this way, a fast and stable control loop is achieved.

Note that also a signal proportional to the deviation from the desired gain, $G_{target} - P_{out}/P_{in}$, the same signal as described by equation 3 which has been identified as optimum modified error signal in the case of reciprocal desired regulator gain, said signal, can be generated if amplifier 79 produces an exponential decay function like $1 - \exp(-x)$. The relation for the output signal of amplifier 79 is shown by equation (4):

$$G_{target} * \{1 - \exp(-[\log(G_{target} \cdot P_{in}) - \log(P_{out})])\} = G_{target} - P_{out}/P_{in} \quad (4)$$

Figure 13:
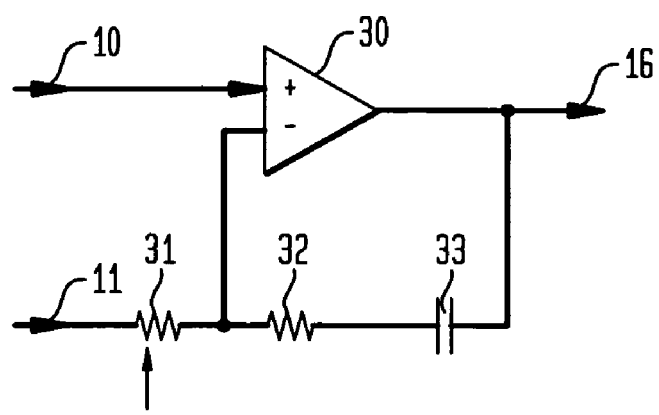
FIG. 13 is a schematic diagram of another embodiment of the regulator circuit of the present invention.

FIG. 13 shows an equivalent electrical circuit for the control circuit including the elements 7, 8, 9, and 12 of FIG. 3. More specifically, the equivalent circuit represents elements 7, 9, 12, 65, and 80 of FIG. 10. Note that the feed-forward loop L1 is combined with the feed-forward loop L3 in this circuit model. Resistor 31 acts In combination with operational amplifier 30, as a differential voltage to current converter. Resistor 32 acts as a current to voltage converter and provides a proportional amplification path. Capacitor 33 acts as a current (via change accumulation) to voltage converter, thereby making a signal path including an integrator function. A variable resistor 31 may act as either a multiplier or divider, for example the multiplier 57 shown in FIG. 10.

With the equivalent circuit model of FIG. 13, every signal path provided in the various embodiments of the invention is represented by an amplification or attenuation factor.

However, certain elements have not been shown for simplification because they are ubiquitous and their gain is constant. It is not irrelevant whether the signals are electrical currents, voltages, optical powers or other quantities, or numerical interpretations within a digital signal processor, coupled to the needed of D/A converters. Similarly, it is not essential that a circuit is implemented as an amplifier or as an attenuator, and if the polarity of signals may change (plain-wise) at any point in the signal paths.

Up to this point, the desired gain has been viewed as a constant. However, this does not mean that the present invention does not work desired gain may not be variable. When viewing the desired gain as a varying entity, a command signal proportional it may be input from outside, and the previously shown circuits can be modified in appropriate places. Applications include multi-stage amplifiers and transmission system designs which accommodate link attenuation changes in this way.

The dynamic response can be improved further by compensating the amplifier delay from the optical input to the optical output, so that the error signal is being generated correctly. The delay compensation may be accomplished by a delay circuit (not shown) which may be placed in loop L3 in any of the embodiments in any location before the subtractor. The delay circuit may be implemented as a delay line, an allpass or lowpass filter, or a digital delay.

With reference to FIGS. 3 and 7–12, the function of subtraction of the power generated by amplified spontaneous emission can be put in any location along loop L3 between input power monitor 5 and subtractor 7, or within subtractor 7 in the form of an adder circuit, or in any location between the output power monitor and subtractor 7, along loop L2 as subtractor circuit. Putting it in loop L3 before any adjusting device for the desired gain has the advantage that the gain dependence of the offset is modeled automatically, even if the circuit is adding a constant offset.

Whereas a little offset has minimum influence on the gain at high input power, a gain modifying function may be implemented by this offset affecting low input powers, favorably increasing the gain for low input powers. However, this is a small deviation from constant-gain operation and does not influence the discussed embodiments of the invention.

The correction circuit may also be implemented in the form of a microcontroller-programmable offset, output from a digital to analog converter and introduced to the loops L2 or L3 in an adding or subtracting circuit.

Other modifications and variations to the invention as well as combinations of the present embodiments will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A gain control circuit for an optical amplifier, comprising:
    a subtractor which outputs an error signal based on a difference between an input power signal and an output power signal of the optical amplifier;
    a regulator which generates a bias and correction signal that reduces the error signal to at least substantially zero, the regulator including:
        an amplification signal path which amplifies the error signal by a desired amplification factor; the amplification signal path including:
            a differentiator which differentiates the error signal;
            a multiplier which multiplies the differentiated error signal by said desired amplification factor; and
            an integrator which integrates the multiplied signal from the multiplier;
        an integration signal path which integrates the error signal; and
        an adder circuit which adds the amplified error signal from the amplification path and the integrated error signal from the integration path to form the bias and correction signal; and
    an adder which adds the input power signal and the bias and correction signal to form a pump control signal which maintains a desired gain of the optical amplifier.

2. A gain control circuit for an optical amplifier, comprising:
    a subtractor which outputs an error signal based on a difference between an input power signal and an output power signal of the optical amplifier;
    a regulator which generates a bias and correction signal that reduces the error signal to at least substantially zero, the regulator including;
        an amplification signal path which amplifies the error signal by a desired amplification factor, the desired amplification factor being derived from the input power signal;
        an integration signal oath which integrates the error signal;
        an adder circuit which adds the amplified error signal from the amplification path and the integrated error signal from the integration path to form the bias and correction signal; and
    an adder which adds the input power signal and the bias and correction signal to form a pump control signal which maintains a desired gain of the optical amplifier.

3. A gain control circuit for an optical amplifier, comprising:
    a subtractor which outputs an error signal based on a difference between an input power signal and an output power signal of the optical amplifier;
    a regulator which generates a bias and correction signal that reduces the error signal to at least substantially zero;
    an adder which adds the input power signal and the bias and correction signal to form a pump control signal which maintains a desired gain of the optical amplifier;
    a non-linear amplifier which amplifies the input power signal prior to being input into said adder; and
    an amplifier of reverse linearity which amplifies the pump control signal prior being input into the optical amplifier.

4. A gain control circuit for an optical amplifier, comprising:
    a subtractor which outputs an error signal based on a difference between an input power signal and an output power signal of the optical amplifier;
    a regulator which generates a bias and correction signal that reduces the error signal to at least substantially zero;
    an adder which adds the input power signal and the bias and correction signal to form a pump control signal which maintains a desired gain of the optical amplifier; and
    a correction unit which removes a bias derived from optical noise.

5. A gain control circuit for an optical amplifier, comprising:
    a subtractor which outputs an error signal based on a difference between an input power signal and an output power signal of the optical amplifier;

a regulator which generates a bias and correction signal that reduces the error signal to at least substantially zero; the regulator including
a circuit which differentiates the error signal;
an adder which adds the error signal with the differentiated error signal;
a multiplier which amplifies an output of the adder by a desired amplification factor; and
an integrator which integrates the amplified signal output from the multiplier to form the bias and correction signal;
an adder which adds the input power signal and the bias and correction signal to form a pump control signal which maintains a desired gain of the optical amplifier.

6. A gain control circuit for an optical amplifier, comprising:
a subtractor which outputs an error signal based on a difference between an input power signal and an output power signal of the optical amplifier;
a regulator which generates a bias and correction signal that reduces the error signal to at least substantially zero, the regulator including
a multiplier which amplifies the error signal by a desired amplification factor;
an integrator which integrates an output of the multiplier; and
an adder which adds the output of the multiplier with the integrated signal output from the integrator to form the bias and correction signal; and
an adder which adds the input power signal and the bias and correction signal to form a pump control signal which maintains a desired gain of the optical amplifier.

7. A method for controlling an optical amplifier, comprising:
generating an error signal proportional to a difference between an input power signal and an output power signal of the optical amplifier;
deriving a bias and correction signal which reduces the error signal to at least substantially zero; the deriving step including:
amplifying the error signal by an amplification factor, the amplification including
calculating a derivative of the error signal;
multiplying the derivative of the error signal by said predetermined amplification factor; and
integrating the multiplied derivative of the error signal;
integrating the error signal;
adding the amplified error signal and the integrated error signal to form the bias and correction signal;
adding the bias signal to the input signal power to form a pump control signal; and
controlling pump power of the optical amplifier based on said pump control signal.

8. A method for controlling an optical amplifier, comprising:
generating an error signal proportional to a difference between an input power signal and an output power signal of the optical amplifier;
deriving a bias and correction signal which reduces the error signal to at least substantially zero; the deriving step including
amplifying the error signal by an amplification factor, the amplification factor being derived from the input power signal
integrating the error signal;
adding the amplified error signal and the integrated error signal to form the bias and correction signal;
adding the bias signal to the input signal power to form pump control signal; and
controlling pump power of the optical amplifier based on said pump control signal.

* * * * *